United States Patent Office 3,429,880
Patented Feb. 25, 1969

3,429,880
7-TRIAZINYLAMINO-COUMARIN
Heinrich Hausermann, Riehen, Switzerland, assignor to Geigy Chemical Corporation, Greenburg, N.Y., a corporation of Delaware
No Drawing. Filed Feb. 28, 1966, Ser. No. 530,386
Claims priority, application Switzerland, Mar. 11, 1965, 3,425/65
U.S. Cl. 260—249.5                  5 Claims
Int. Cl. C07c 97/00; D06l 3/12

ABSTRACT OF THE DISCLOSURE 7-triazinylamino-coumarin compounds of the formula:

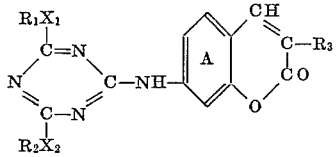

wherein each of $R_1$ and $R_2$ represents an unsubstituted alkyl, alkenyl, alkynyl, cycloalkyl, aralkyl or aryl radical or one substituted by non-coloring substituents; $X_1$ and $X_2$ each represent oxygen or sulfur; $R_3$ represents an unsubstituted isocyclic-aromatic ar heterocyclic-aromatic radical or one of these radicals substituted by non-coloring substituents, and the benzene ring A can carry non-coloring substituents; are useful for optical brightening agents, particularly for high molecular weight organic materials especially hydrophobic polymeric material such as polyvinyl chloride, nylons, polyolefins and the like.

---

The present invention concerns new 7-triazinylamino-coumarins, a process for the production thereof, their use for the optical brightening of high molecular organic materials, as well as, as industrial products, high molecular organic materials having a content of said new optical brightener.

In particular, the invention concerns compounds of the formula

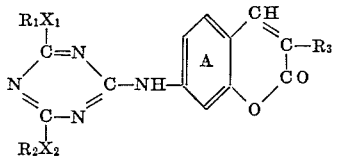

wherein:

each of $R_1$ and $R_2$ represents an unsubstituted alkyl, alkenyl, alkynyl, cycloalkyl, aralkyl or aryl radical or one substituted by non-coloring substitutents,
$X_1$ and $X_2$ each represent oxygen or sulfur,
$R_3$ represents an unsubstituted isocyclic-aromatic or heterocyclic-aromatic radical or one of these radicals substituted by non-coloring substitutents, and the benzene ring
A can carry non-coloring substituents.

The new 7-triazinyl aminocoumarins of the above formula are almost colorless to yellowish, well crystallised substances. Insofar as they contain sulfonic acid and/or carboxylic acid groups, they are water-soluble in the form of their alkali or ammonium salts and are suitable as such for the brightening of fibers containing hydroxyl groups such as cotton and fibers containing polyamide such as wool or nylon.

However, water insoluble 7-trianzyl aminocoumarins of the above formula which do not contain sulfonic acid and carboxylic acid groups are preferred. These are soluble in organic solvents such as cyclic ethers, e.g., in dioxan, alkanols, lower fatty acids, lower fatty acid esters, lower fatty acid amides, lower ketones or in unhalogenated or halogenated aromatic hydrocarbons. The almost colorless organic solutions containing them often have a vivid violet to blue fluorescence. The water-insoluble 7-triazinyl aminocoumarins are suitable for the optical brighening of high molecular synthetic organic material, especially for the brightening of hydrophobic synthetic organic polymeric compounds, among which are in particular polycondensation products of polyaddition products, such as polyvinyl chloride, synthetic polyamides such as nylon 6 and nylon 66, polyolefins, e.g., polyethylene or polyproplylene, and polyesters, particularly polyesters or aromatic polycarboxylic acids with polyvalent alcohols such as polyethylene glycol terephthalates and also cellulose esters such as cellulose acetates.

High molecular hydrophobic organic materials of the above-mentioned types are optically brightened, for example, by incorporating thereinto small amounts of optical brighteners according to the invention, preferably 0.001 to 0.3% calculated on the weight of the material to be brighened, optionally together with other substances such as plasticisers, stabilizers or pigments. The compounds according to the invention can be incorporated into a melt of polyvinyl chloride, cellulose acetate, polyethylene, polypropylene and the like synthetic polymer materials prior to extrusion of fibers or foils therefrom, for example, dissolved in plasticisers such as dioctyl phthalate, or they can be incorporated together with stabilizers such as dibutyl tin dilaurate or sodium pentaoctyl tripolyphosphate, or with pigments such as, e.g., titanium oxide. Depending on the type of the material to be brightened, the brighteners can also, for example, be dissolved in the monomers before polymerization, dissolved in the polymeric mass or, together with the polymers, dissolved in a solvent. The material pretreated in this way is then brought into the final form by known methods such as spinning, calendering, pressing, extruding, painting, casting or injection moulding.

Incorporation into the aforesaid melts exposes the coumarin derivatives according to the invention to temperatures of 120–160° C. and even higher. That coumarin compounds of the above formula according to the invention can be subjected to such heat treatment is surprising as experience has shown that, in contrast to monoalkoxy-s-triazines, dialkoxy-s-triazinyl compounds further substituted with a secondary amino group, will undergo isomerization when heated to as low as 110°–160° C., [cf. F. B. Schaefer et al., J. Am. Chem. Soc., 73, 2996 (1951)]. Such isomerized products have no useful brightening power. The good thermostability of the compounds according to the invention which makes a heat treatment possible is, therefore very surprising.

Indeed, it was believed in the past that the 6-position of the s-triazinyl ring in 4-alkoxy-2-[coumarin-(7)-amino]-s-triazines must be substituted by an N-unsubstituted or N-organically substituted amino group or by an alkyl group, if the necessary heat stability is to be attained.

When it is desired to brighten high-molecular hydrophobic organic material in the form of finished fibers, e.g., synthetic polyamide fibers such as nylon, or polyester fibers such as polyethylene glycol terephthalate or cellulose ester fibers, advantageously an aqueous dispersion of the water-insoluble coumarin compounds according to the invention is used. This brightener dispersion preferably contains 0.01–0.2% of such coumarin compounds, calculated on the weight of the fibers. In addition it can contain auxiliaries such as dispersing agents, e.g., addition products of alkylene oxides and fatty alcohols having 10 to 18 carbon atoms or to phenol-polyether containing lipophilic radicals and having 10 to 25 ether oxygen atoms, e.g., octadecyl-pentadecaglycol ether or octyl- or nonylphenol dodecaglycol ethers or the like; the dispersion can also contain washing agents and carriers such as 1,2-dichloro-benzene.

The above-mentioned fiber materials are brightened with the aqueous brightener dispersion either by the exhaustion process at temperatures of, preferably, 60 to 100° C., or by pad dyeing in the foulard. In the latter case, the goods are impregnated with the brightener dispersion and then finished by a dry or moist heat treatment, e.g., by heating to temperatures of over 100° C. or by steaming at 70° to 105° C. with saturated or slightly overheated steam. The fibers are then rinsed and dried.

The resulting brightened fiber materials have a pure, neutral white aspect or show a desirable bluish to blue-violet hue, considered to be lightly reddish by some observers, while the known 4-alkoxy-6-amino-2-coumaryl-amino-s-triazine brighteners mentioned hereinbefore, impart to brightenings obtained under similar conditions especially on nylon fibers, undesirable greenish effects, especially after repeated washing with brightening agent-containing wash-liquors.

On the contrary, the aforesaid known brighteners are very well suited for brightening Orlon-type acrylic fibers, on which the brighteners according to the invention show no satisfactory brightening effect.

High molecular organic materials optically brightened with brighteners according to the invention, particularly polyamide and polyester fiber materials brightened with 7-triazinyl amino-coumarins free from sulfonic acid or carboxylic acid groups, have a pleasant, pure white appearance with a bluish to blue-violet hue, and no undesirable greenish effects. These brightenings have superior fastness to light, particularly on polyethylene glycol terephthalate fibers such as Dacron, especially when compared with brightenings obtained with known 2-[coumarin-(7)-amino]-s-triazines which are substituted in 4-position at the s-triazine ring by an alkyl radical and in 6-position by an alkoxy radical. Moreover, when brightening the above-mentioned fiber materials with an aqueous brighter dispersion, it is a special advantage of the optical brighteners according to the invention that they can be applied to these fibers and draw equally well and with maximal brightening effect thereon from an alkaline, a neutral and from an acid bath, i.e., from baths having pH values in the range of from about 2 to 11. This means that these brighteners can be applied in mixture with strongly alkaline detergents as they are required in laundering industry, and equally well in acid baths as they are often required in the dyeing industry. In contrast thereto, the above-mentioned known 2-coumarinamino-4-alkyl-6-alkoxy-s-triazines fail to afford maximal brightening from a neutral to alkaline bath.

Preferred on account of their good drawing power from alkaline baths on polyamide fabrics in combination with particularly high thermostability are those coumaryl-amino-s-triazines according to the invention which fall under the formula

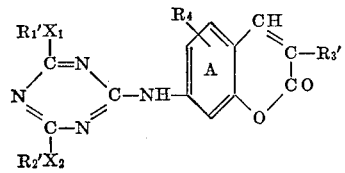

wherein $X_1$ and $X_2$ have the same meaning as in the preceding formula, each of $R_1'$ and $R_2'$ represents lower alkyl, alkenyl of from 3–4 carbon atoms, or cyclohexyl, $R_3'$ represents phenyl, thienyl, halogenophenyl, especially chloro- or bromophenyl, or lower alkylphenyl, and $R_4$ represents hydrogen or lower alkyl.

In particularly valuable 7-triazinyl aminocoumarins of the above formula, $R_1'$ and $R_2'$ each represent a lower alkyl group, particularly the methyl or ethyl group, and $R_3'$ represents the phenyl group, and the benzene ring A is preferably unsubstituted.

Preferred because of particularly good brightening effects on nylon and the like synthetic polyamide fibers when applied from an aqueous brightening bath, in a goods-to-liquor ratio ranging from about 1:5 to 1:100 or even smaller, are those coumarylamino-s-triazines according to the invention which fall under the formula

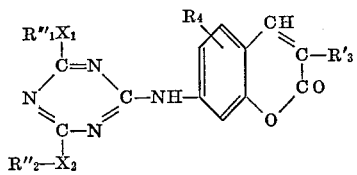

wherein $X_1$ and $X_2$ have the same meanings as in the preceding formula, $R''_1$ represents alkynyl of from 3 to 4 carbon atoms, lower alkyl-phenyl-lower alkyl, halogeno-phenyl-lower alkyl, especially chloro- and bromo-phenyl-lower alkyl, lower alkoxy-lower alkyl, hydroxy-lower alkyl, hydroxy-lower alkoxy-lower alkyl, phenoxy-lower alkyl, phenyl, lower alkyl-phenyl, halogeno phenyl, especially chloro- and bromo-phenyl, phenyl-phenyl, phenoxy-phenyl or lower alkoxy-phenyl, $R''_2$ represents lower alkyl, alkenyl of from 3 to 4 carbon atoms, cyclohexyl, alkynyl of from 3 to 4 carbon atoms, lower alkyl-phenyl-lower alkyl, halogeno-phenyl-lower alkyl, especially chloro- and bromo-phenyl-lower alkyl, lower alkoxy-lower alkyl, hydroxy-lower alkyl, hydroxy-lower alkoxy-lower alkyl, phenoxy-lower alkyl, phenyl, lower alkyl-phenyl, halogenophenyl, especially chloro- and bromo-phenyl, phenyl-phenyl, phenoxy-phenyl or lower alkoxy-phenyl, $R_2''$ represents lower alkyl, alkenyl of from 3 to 4 carbon atoms, cyclohexyl, alkynyl of from 3 to 4 carbon atoms, lower alkyl-phenyl-lower alkyl, halogeno-phenyl-phenyl-lower alkyl, lower alkoxy-lower alkyl, hydroxy-lower alkyl, hydroxy-lower alkoxy-lower alkyl, phenoxy-lower alkyl, phenyl, lower alkyl-phenyl, halogenophenyl, especially chloro- and bromo-phenyl, phenyl-phenyl, phenoxy-phenyl or lower alkoxy-phenyl, $R_3'$ represents phenyl, thienyl, halogenophenyl, especially chloro- or bromophenyl, or lower alkyl-phenyl, and $R_4$ represents hydroxy or lower alkyl.

Lower as used in this specification and the appended claims in connection with an aliphatic means that such radical has not more than 4 carbon atoms.

The coumarylamino-s-triazines according to the invention are produced by reacting a 2,4,6-trihalogen-s-triazine, such as, 2,4,6-trichloro- or 2,4,6-tribromo-s-triazine, in any order desired with an equimolar amount of a compound of the formula $$R_1-X_1-H \qquad (I)$$

with an equimolar amount of a compound of the formula $$R_2-X_2-H \qquad (II)$$

in which

Formulas $R_1$, $R_2$, $X_1$ and $X_2$ have the same meanings as given hereinbefore, $R_1$ and $R_2$ each represent an unsubstituted alkyl, alkenyl, cycloalkyl, aralkyl or aryl radical or such radical substituted by non-coloring substituents, and $X_1$ and $X_2$ each represent oxygen or sulfur, and with an equimolar amount of a 7-aminocoumarin compound of the formula

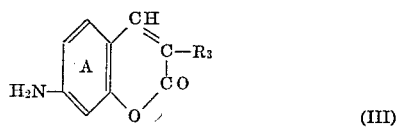

wherein

R₃ represents an unsubstituted isocyclic-aromatic or heterocyclic-aromatic radical or one substituted by non-coloring substituents, and the benzene ring A can carry non-coloring substituents.

If $R_1$ and $R_2$ each represent an unsubstituted alkyl radical, then this advantageously has 1 to 4 carbon atoms; if they represent an alkenyl radical then this is, particularly, a $\Delta^2$-alkenyl radical having at least 3 carbon atoms; if they represent a cycloalkyl radical then this preferably has six members. If they represent an aralkyl radical, then this is advantageously an α-aryl-alkyl radical having a mononuclear ring; if they represent an aryl radical then this is preferably mononuclear.

Insofar as the radicals $R_1$ and $R_2$ mentioned carry non-coloring substituents, examples of substituents are the hydroxyl group, lower alkoxyalkyl and hydroxyalkyl groups, aryloxy groups, particularly the phenoxy group, in addition in aromatic rings also low alkyl groups or aryl groups, particularly the phenyl group, or halogens up to the atomic number 35 such as fluorine, chlorine or bromine.

If $R_3$ in Formula III represents an isocyclic-aromatic radical, then this is chiefly the phenyl radical; when $R_3$ is a heterocyclic-aromatic radical, then this is the thienyl-(2) radical. If these radicals as well as the benzene ring A in Formula III carry non-coloring substituents, substituents are preferably lower alkyl groups and halogens up to the atomic number 35 and, in an isocyclic-aromatic radical $R_3$, also the sulfonic acid group.

Starting materials of Formulae I, II and III are known or can be produced in the known manner. For example, 7-amino-coumarins of Formula III are obtained by condensing nitriles of the formula NC—CH₂—R₃ with 2-methoxy-4-acetylamino benzaldehydes to form α-R₃-substituted 4-acetylamino-2-methoxy cinnamic acid nitriles, dealkylating the methoxy group with ring closure and saponifying to form the coumarins and hydrolysing the acetylamino group.

The reaction of the halogen-S-triazine with the compounds of Formulae I, II and III is performed in the usual way in the presence of acid binding agents, in the first step at about 0–10° C., in the second step at about 0–60° C. and in the third step about 60–95° C.

Preferably the halogen-S-triazine is reacted in the first or also in the second step with the 7-aminocoumarin compound of Formula III, whilst the reaction with the compounds of Formulae I and II can be performed in the first, second or third step.

Starting materials of Formula I or II wherein $X_1$ or $X_2$ is oxygen are preferably used in excess. If they are reacted in the first step with the halogen-s-triazine, the reaction is advantageously performed in the presence of agents having a weakly alkaline reaction such as alkali bicarbonates. If they are reacted in the second or third step, then equivalent amounts of their alkali compounds are used, e.g. the sodium or potassium alcoholates or phenolates. In this case an excess of the organic hydroxy compounds of Formula I or II advantageously serves as solvent or flux.

If starting materials of Formula I or II wherein $X_1$ or $X_2$ is sulphur, then advantageously the equivalent amounts of their alkali metal salts in aqueous-organic solvent are used. In this case, advantageously water soluble open or cyclic ethers such as diethylene glycol dimethyl or diethyl ether or dioxan or tetrahydrofuran are used as organic part of these solutions.

The reaction of the halogen triazine compound with the 7-aminocoumarin compound of Formula III is performed in the usual way, advantageously in the presence of water soluble aliphatic ketones such as acetone or methylethyl ketone, or in the presence of water soluble open or cyclic ethers and also in the presence of acid binding agents such as alkali carbonates.

The following non-limitative examples illustrate the invention further. The temperatures are given therein in degrees centigrade. Percentages are given by weight unless expressly stated otherwise.

Example I 10 g. of a fabric made from slightly yellowish polyadipic acid hexamethylenediamine staple fiber (nylon, E. I. du Pont de Nemours, Wilmington, Del., U.S.A.) are treated for 30 minutes at 75° in a dyebath (liquor ratio 1:40) containing 0.01 g. of brightener of the formula

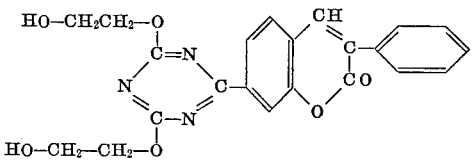

and 0.2 g. of olein alcohol pentadecaglycol ether. The goods are then rinsed and dried. The nylon fabric so treated appears to be considerably whiter in daylight than untreated fabric.

Example II 10 g. of a slightly yellowish fabric made from polyterephthalic acid glycol ester, commercially known as "Dacron" are treated in a bath containing 0.005 g. of the brightener used in Example I and 0.3 g. of octadecenol pentadecaglycol ether. The goods are treated for 30 minutes at 95–100° and the liquor ratio is 1:50. The goods are then rinsed and dried. Material so treated has a much whiter appearance than an untreated comparative sample of the same material.

Example III 10 g. of undyed cellulose acetate yarn are treated in a 75° hot bath (liquor ratio 1:30) for 30 minutes, which bath contains 0.01 g. of finely dispersed brightener of the formula

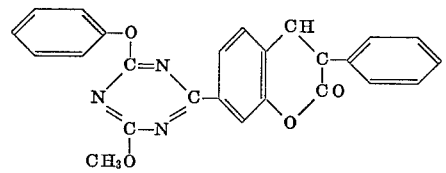

After rinsing and drying, the yarn so treated has a considerably more white appearance than before treatment.

Example IV 10 g. of a fabric made from poly(ethylene glycol terephthalate) ester are treated for 30 minutes in a 90–100° hot bath (liquor ratio 1:30) containing 0.01 g. of the brightener used in Example III, 0.3 g. of o-dichlorobenzene as well as 0.1 g. of octyl phenol dodecaglycol ether. After rinsing and drying, the fabric has clearly a more white appearance than before the treatment.

Example V

A fabric made from polyterephthalate acid glycol ester is pad dyed in a foulard at room temperature with a liquor which contains 0.6 g. of brightener of the formula

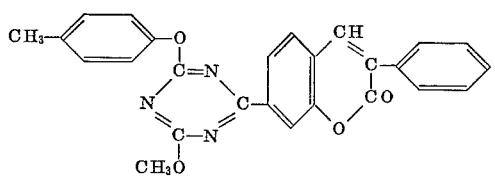

and 1.5 g. of nonylphenol dodecaglycol ether in 1000 g. of water. The fabric is squeezed out to a liquor content of 75% and dried at 60°. The fabric is then heated for 15 minutes at 125–130°. In this way fabric having a brilliant white appearance is obtained.

Example VI 100 g. of undyed nylon material are washed at 70° in a washing liquor (liquor ratio 1:10) for 30 minutes, which liquor contains 0.05 g. of brightener of the formula

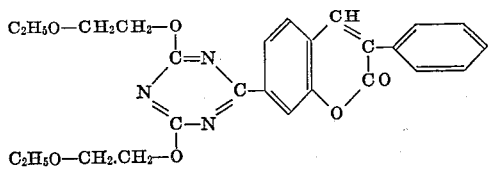

and also 8 g. of a synthetic washing agent. The goods are then rinsed and dried. The fabric obtained has a much more brilliant appearance than fabric washed without the addition of brightening agent. Similar good brightening effects are obtained by replacing the above mentioned brightener by a product produced according to Examples 1 to 5, infra.

Example VII 0.06 g. of a brightener of the formula

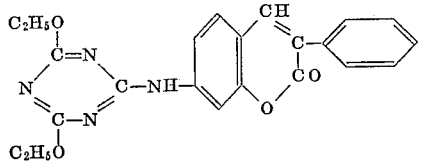

are gelatinized for 15 minutes on a roller mixed at 160° with a mixture consisting of 67 g. of polyvinyl chloride powder, 33 g. of dioctyl phthalate, 2 g. of di-n-butyl tin dilaurate and 0.3 g. of sodium pentaoctyl tripolyphosphate and then drawn off into films. The polyvinyl chloride films so produced have a violet fluorescence in daylight and a clearly more white appearance than corresponding films which are produced without the addition of this brightening agent.

Example VIII 0.03 g. of brightener of the formula

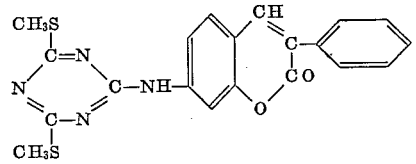

and 7 g. of titanium dioxide (Anatas) together with 67 g. of polyvinyl chloride, 33 g. of dioctyl phthalate, 2 g. of di-n-butyl tin dilaurate and 0.3 g. of sodium pentaoctyl tripolyphosphate are worked up in the manner mentioned in Example VII into an opaque film. The film so produced has a much more white appearance than a comparative sample produced without the addition of brightener.

Example 1

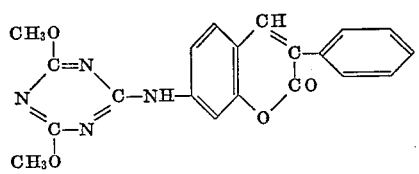

18.5 g. of 2,4,6-trichloro-s-triazine are dissolved in 800 g. of acetone and 500 g. of crushed ice are added while stirring. A solution of 23.7 g. of 3-phenyl-7-amino-coumarin in acetone is poured into the mixture obtained within 10 minutes while cooling and stirring and the hydrochloric acid liberated is neutralised by the dropwise addition of a 15% aqueous sodium carbonate solution. When all the aminocoumarin has been added, the pale yellowish suspension is stirred at 0–5° while the reaction is kept neutral with sodium carbonate solution until a sample reacted with nitrous acid shows that there is no more diazonium compound. The reaction is complete after 2–3 hours. In this way, 3-phenyl-7-[4',6'-dichloro-s-triazinyl-(2')-amino]-coumarin is obtained as yellowish suspension.

15 g. of the 3-phenyl-7-[4',6'-dichloro-s-triazinyl-(2')-amino]-coumarin so obtained are refluxed for 10 hours while stirring with a solution of 1.8 g. of sodium in 350 ml. of methanol. A viscous yellow slurry is obtained. After cooling, the product formed is filtered off under suction, washed with methanol and water and dried at 80° in vacuo.

14 g. of 3-phenyl-7-[4',6'-dimethoxy-s-triazinyl-(2')-amino]-coumarin of the above structural formula are obtained as a pale yellowish powder which decomposes at 215–220°. To further purify, the new coumarin derivative is recrystallised from chlorobenzene or ethylene glycol monomethyl ether. The product dissolves in organic solvents such as ethanol with an intensive blue-violet fluorescence. The new compound is suitable for the brightening of polyamide and polyester fibers.

3 - Aryl - 7 - [4',6'-dimethoxy-s-triazinyl-(2')-amino]-coumarins, which are brighteners with similar properties, are obtained if the 3-phenyl-7-[4',6'-dichloro-s-triazinyl-(2')-amino]-coumarin is replaced by the equivalent amount of one of the intermediate products given in Table I and otherwise the procedure given in Example 1 is followed.

TABLE I

| Example No. | R |
|---|---|
| 2 | (phenyl-coumarin with p-CH₃) |
| 3 | (phenyl-coumarin with m-CH₃) |
| 4 | (phenyl-coumarin with o-CH₃) |
| 5 | (phenyl-coumarin with 2,4-di-CH₃) |
| 6 | (phenyl-coumarin with p-Cl) |
| 7 | (phenyl-coumarin with o-Cl) |

TABLE 1—Continued

| Example No. | R |
|---|---|
| 8 | (structure: benzofuran-coumarin with 3,4-dichlorophenyl group) |
| 9 | (structure: CH₃-substituted coumarin with phenyl group) |
| 10 | (structure: coumarin with thiophene group) |
| 10a | (structure: coumarin with 3-bromophenyl group) |

The intermediate products used in Examples 2 to 10 are pale yellowish crystal powders which decompose above 250°. They dissolve with difficulty in the usual unpolar organic solvents. They are obtained analogously to the method given in Example 1 from halogen-s-triazines and the corresponding 3-aryl-7-aminocoumarins. The latter are produced by condensing correspondingly substituted benzyl cyanides or 2-(cyanomethyl)-thiopene with 2-methoxy-4-acetylaminobenzaldehyde or with 2-methoxy-5-methyl-4-acetyl-aminobenzaldehyde (M.P. 121°), dealkylating the α-substituted o-methoxy cinnamic acid nitrile formed, closing the ring to form the coumarin and hydrolysing the acetylamino group.

The end products produced according to Examples 4, 5 and 7 of Table I have a clear violet fluoresence in organic solvents and produce violetty, i.e., reddish tinged brightenings, whilst the end products produced according to Examples 2, 3, 6, 8, 9 and 10 have blue to blue-violet fluoresence and lend to the substrata treated therewith a blueish tinged fluorescence or a blueish brightening effect.

Example 11

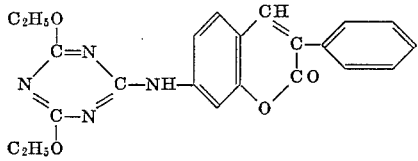

6.9 g. of sodium are dissolved in 1000 ml. of abs. ethanol 57 parts of 3-phenyl-7-[4',6'-dichloro-s-triazinyl-(2')-amino]-coumarin, produced according to Example 1, are added and the suspension obtained is stirred for 4 hours at 75–80° under reflux.

After cooling, the 3-phenyl-7-[4',6'-diethoxy-s-triazinyl-(2')-amino-coumarin of the above structural formula is filtered off, washed with water and ethanol and dried in vacuo at 80°. To further purify, the product is recrystallised from 1000 ml. of chlorobenzene. The new coumarin compound froms pale yellowish crystals which temporarily melt at 210° and decompose while solidifying towards 240°. This compound too has a vivid blue-violet fluorescence in organic solvent such as methanol. If fabrics or knitted goods made from synthetic polyamide fibres are treated at 80–90° with an aqueous dispersion of this new coumarin compound, these textiles are very beautifully brightened.

Corresponding 3-phenyl-7-[4',6'-dialkoxy-s-triazinyl-(2')-amino]-coumarin having similar properties which can be used as optical brighteners are obtained if the 1000 ml. of ethanol are replaced by one of the alcohols given in Table II and otherwise the procedure given in Example 11 is followed.

TABLE II

| Example No. | Alcohol |
|---|---|
| 12 | C₃H₇OH |
| 13 | C₄H₉OH |
| 14 | HOCH₂CH₂OH |
| 15 | CH₃OCH₂CH₂OH |
| 16 | C₂H₅OCH₂CH₂OH |
| 17 | C₆H₅—OCH₂—CH₂OH |
| 18 | HOCH₂CH₂OCH₂CH₂OH |
| 19 | C₆H₅—CH₂OH |
| 19a | CH₂=CH—CH₂—OH |
| 19b | CH≡C—CH₂—OH |
| 19c | C₆H₅—CH₂—CH₂—OH |
| 19d | C₆H₅—CH₂—CH₂—OH (naphthyl) |
| 19e | Br-C₆H₄—CH₂—OH |

EXAMPLE 20

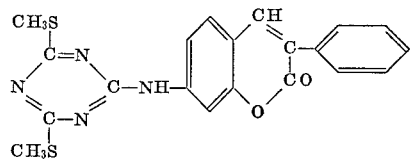

10 g. of methyl mercaptan are dissolved in a solution of 8.4 g. of sodium hydroxide and 100 ml. of water at 0–5°. This sodium-mercaptide solution is added at room temperature to a suspension of 38.5 g. of 3-phenyl-7[4',6'-dichloro-s-triazinyl-(2')-amino]-coumarin, produced according to Example 1, in 400 ml. of dioxan while stirring. The temperature of the mixture rises to 35–40°. On completion of the reaction, the mixture is stirred for 10 hours at 85–90°.

After cooling, the yellowish 3-phenyl-7-[4',6'-dimethylmercapto-s-triazinyl-(2')-amino]-coumarin obtained of the above structural formula is filtered off, washed with water and with ethanol and dried at 80° in vacuo.

This compound melts at 245° and, in dimethyl formamide solution or ethylene glycol monomethyl ether solution, has a strong blue-violet fluorescence in daylight. The new compound gives a pleasing white appearance to polyester and polyamide substrata.

If the 10 g. of methyl mercaptan are replaced by equivalent amounts of one of the mercapto compounds given in Table III and otherwise the procedure given in Example 20 is followed, then corresponding 3-phenyl-7-[4',6'- bis-alkyl- or -phenyl- mercapto-s-triazinyl-(2')-amino]-coumarins are obtained which are also useful brighteners.

[4',6' - diphenoxy-s-triazinyl-(2')-amino]-coumarins are obtained which are also useful optical brighteners.

TABLE III

| Example No. | Mercapto compounds |
| --- | --- |
| 21 | C₃H₇SH |
| 22 | HOCH₂CH₂SH |
| 23 | CH₃OCH₂CH₂SH |
| 24 | ⌬—CH₂SH |
| 25 | Cl—⌬—CH₂SH |
| 26 | CH₃—⌬—CH₂SH |
| 27 | ⌬—SH |
| 27a | CH₂=CH—CH₂SH |
| 27b | ⌬H—SH |
| 28 | CH₃—⌬—SH |
| 29 | Cl—⌬—SH (Cl) |
| 30 | CH₃—⌬—SH (CH₃) |

TABLE IV

| Example No. | Phenols |
| --- | --- |
| 32 | CH₃—⌬—OH |
| 33 | Cl—⌬—OH |
| 34 | ⌬—OH (OCH₃) |
| 35 | Cl—⌬—OH (OCH₃) |
| 36 | Cl—⌬—OH (Cl) |
| 36a | Br—⌬—OH |

Example 37

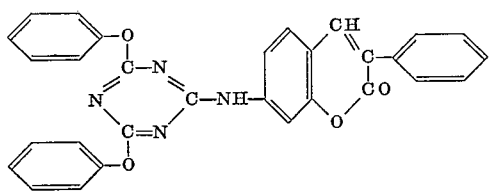

Example 31

19.2 g. of 3-phenyl-7-[4',6'-dichloro-s-triazinyl-(2')-amino]-coumarin, produced according to Example 1, are added to a 50–60° hot melt of 100 g. of phenol, 35 ml. of water and 4.4 g. of sodium hydroxide. The mixture is stirred for 18 hours at 85–90° and, after cooling, diluted with 200 ml. of 85% ethanol. The precipitated yellowish reaction product is filtered off, washed with ethanol and water and dried at 80–85° in vacuo. On recrystallising from a mixture of 180 ml. of dimethyl formamide and 300 ml. of ethanol, the compound of the above structural formula is obtained as almost white crystals which melt at 284°. A solution thereof in many organic solvents such as in ethanol, dimethyl formamide, ethylene glycol monomethyl ether has a blue-violet fluorescence. Due to this property, the compound is a very good brightener for organic synthetic plastic materials.

If instead of the 100 g. of phenol, the same amount of one of the phenols given in Table IV is used then, with otherwise the same procedure, corresponding 3-phenyl-7-

336 g. of sodium hydrogen carbonate and 368 g. of 2,4,6-trichloro-s-triazine are added to a mixture of 200 ml. of methanol and 250 ml. of water. The mixture is stirred for 30 minutes at 30°, water is added, the precipitated white crystals are filtered off and washed with water and dried.

46 g. of the 2-methoxy-4,6-dichloro-s-triazine so obtained are dissolved with 59 g. of 3-phenyl-7-aminocoumarin in 1500 ml. of acetone while stirring. The reaction mixture is stirred for another 24 hours at 30° and the precipitated crystalline yellowish 3-phenyl-7-[4'-methoxy-6'-chloro-s-triazinyl-(2')-amino]-coumarin is filtered off, then washed with acetone and finally with water. This intermediate product dissolves in dimethyl formamide with a blueish fluorescence and melts at over 220° with decomposition.

9.6 g. of the 3-phenyl-7-[4'-methoxy-6'-chloro-s-triazinyl-(2')-amino]-coumarin so obtained are slurried in 100 ml. of dioxan and, at 20–30°, 13 ml. of an aqueous 2 N sodium-ethylmercaptide solution are added. The mixture is stirred for 40 hours at 85°. After cooling, the yellowish crystalline reaction product is filtered off, washed with ethanol and dried in vacuo at 70–80°. The end product of the above structural formula so obtained is recrystallised from ethanol whereupon pale yellowish crystals which melt at 159–161° are obtained. The new coumarin compound has properties similar to those of the compounds obtained according to Example 1 or 11.

If in this example, the 13 ml. of 2 N sodium-ethylmercaptide solution are replaced by 13 ml. of a 2 N solution of the sodium salt of one of the mercapto compounds given in the following Table V then, with otherwise the same procedure, corresponding 3 - phenyl-7-[4'-methoxy-6'- alkyl- or -phenyl- mercapto-s-triazinyl-(2')-amino]-coumarins are obtained which are also useful brighteners.

TABLE V

| Example No. | Mercapto compound |
|---|---|
| 38 | CH₃SH |
| 39 | n-C₃H₇—SH |
| 40 | n-C₄H₉—SH |
| 41 | ⟨phenyl⟩—CH₂SH |
| 42 | ⟨phenyl⟩—SH |
| 42a | CH₂=CH—CH₂—SH |
| 42b | ⟨H-phenyl⟩—SH |

Example 43

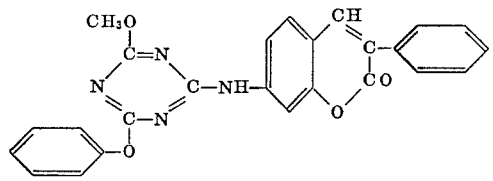

9.6 g. of 3-phenyl-7-[4'-methoxy-6'-chloro-s-triazinyl-(2')-amino]-coumarin, obtained according to Example 37 are added to a 50–60° hot melt consisting of 50 g. of phenol, 15 ml. of water and 5.5 ml. of concentrated sodium hydroxide solution, the addition being made while stirring. The mixture is stirred for 16 hours at 85–90° and, after cooling, 150 ml. of 30% aqueous ethanol are added. The precipitate formed is filtered off, washed with dilute ethanol and dried.

The coumarin compound of the above structural formula is obtained as pale yellowish crystals which melt at 210°. In organic solvents such as dioxan, the compound has a blue-violet fluorescence.

If, instead of the 50 g. of phenol, the same amount of one of the phenols given in Table VI is used and otherwise the procedure given in the example is followed, then analogous coumarin compounds are obtained which are also useful optical brighteners.

TABLE VI

| Example No. | Phenols |
|---|---|
| 44 | CH₃—⟨phenyl⟩—OH |
| 45 | OCH₃-⟨phenyl⟩—OH |
| 46 | ⟨biphenyl⟩—OH |
| 47 | ⟨phenyl⟩—O—⟨phenyl⟩—OH |

Example 48

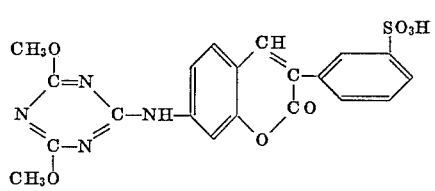

8.0 g. of 3-(m-sulphophenyl)-7-aminocoumarin are dissolved in 16 ml. of water and 12.5 ml. of 2 N sodium hydroxide solution and, at 20–25°, 4.5 g. of pulverised 2-methoxy-4,6-dichloro-s-triazine, produced according to Example 37, are added whereupon the mixture is stirred, while keeping the reaction neutral, until no more free amino groups can be traced. 200 ml. of methanol and a solution of 1 g. of sodium hydroxide in 3 ml. of water are added to the yellow suspension obtained and the reaction mixture is heated at 60–70° until it has a neutral reaction. After distilling off excess methanol, the reaction mixture is cooled and the yellowish precipitate is filtered off and dried.

The sodium salt of 3-(m-sulphophenyl)-7-[4',6'-dimethoxy-s-triazinyl-(2')-amino]-coumarin so obtained is a water soluble yellowish powder, the diluted aqueous solution of which fluoresces blue in daylight.

This compound can be used for the optical brightening of cellulose fibres from an acid to neutral bath and of polyamide fibres from an acid bath.

The 3-(m-sulphophenyl)-7-aminocoumarin used as starting material is obtained by sulphonating 3-phenyl-7-aminocoumarin with sulphuric acid monohydrate in the usual way.

I claim:

1. A compound of the formula:

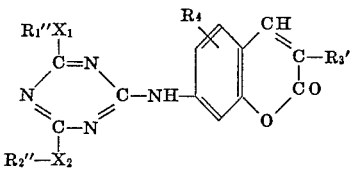

wherein each of $X_1$ and $X_2$ represents oxygen or sulfur, $R_1''$ represents a member selected from the group consisting of alkynyl of from 3 to 4 carbon atoms, lower alkyl-phenyl-lower alkyl, halogeno-phenyl-lower alkyl, lower alkoxy-lower alkyl, hydroxy lower alkyl, hydroxy-lower alkoxy-lower alkyl, phenoxy-lower alkyl, phenyl, lower alkyl-phenyl, holagenophenyl, phenyl-phenyl, phenoxy-phenyl and lower alkoxy-phenyl, $R_2''$ represents a member selected from the group consisting of lower alkyl, alkenyl of from 3 to 4 carbon atoms, cyclohexyl, alkynyl of from 3 to 4 carbon atoms, lower alkyl-phenyl-lower alkyl, halogeno-phenyl-lower alkyl, lower alkoxy-lower alkyl, hydroxy-lower alkyl, hydroxy-lower alkoxy-lower alkyl, phenoxy-lower alkyl, phenyl, lower alkyl-phenyl, halogenophenyl, phenyl-phenyl, phenoxy-phenyl and lower alkoxy-phenyl, $R_3'$ represents phenyl, thienyl, holagenophenyl, especially chloro- or bromophenyl, or lower alkyl-phenyl, and $R_4$ represents hydrogen or lower alkyl.

2. A compound as defined in claim 1, wherein $R_1''$ represents methyl, $X_1$ represents oxygen, $R_2''$ represents phenyl, $X_2$ represents oxygen, $R_3'$ represents phenyl and $R_4$ represents hydrogen.

3. A compound of the formula:

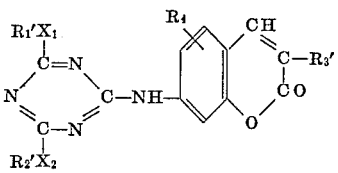

wherein each of $R_1'$ and $R_2'$ represents methyl,
each of $X_1$ and $X_2$ represents sulfur,
$R_3'$ represents phenyl, and
$R_4$ represents hydrogen.

4. A compound of the formula:

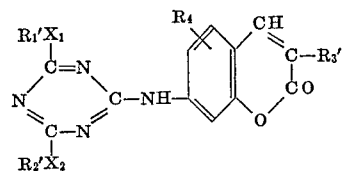

wherein each of $R_1'$ and $R_2'$ represents methyl,
each of $X_1$ and $X_2$ represents oxygen,
$R_3'$ represents phenyl, and
$R_4$ represents methyl.

5. A compound of the formula:

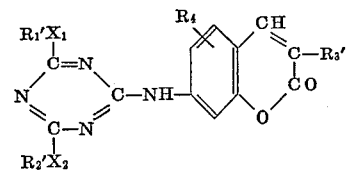

wherein $R_1'$ represents methyl,
$R_2'$ represents ethyl,
$X_1$ represents oxygen,
$X_2$ represents sulfur,
$R_3'$ represents phenyl, and
$R_4$ represents hydrogen.

References Cited

UNITED STATES PATENTS

| | | | |
|---|---|---|---|
| 2,945,033 | 7/1960 | Hausermann | 260—247.5 |
| 3,123,617 | 3/1964 | Hausermann | 260—310 |
| 3,184,459 | 5/1965 | Siegel et al. | 260—249.5 |
| 3,242,177 | 3/1966 | Schellhammer et al. | 260—249.5 |
| 3,244,711 | 4/1966 | Berendes et al. | 260—249.5 |

HENRY R. JILES, *Primary Examiner.*

J. M. FORD, *Assistant Examiner.*

U.S. Cl. X.R.

252—301.2; 8—1.1; 117—33.5; 260—343.2